H. E. DEY.
CONTROLLER FOR AND METHOD OF REGULATING ELECTRIC MOTORS.
APPLICATION FILED SEPT. 29, 1914.

1,222,852.

Patented Apr. 17, 1917.

UNITED STATES PATENT OFFICE.

HARRY EUGENE DEY, OF JERSEY CITY, NEW JERSEY.

CONTROLLER FOR AND METHOD OF REGULATING ELECTRIC MOTORS.

1,222,852.　　　　　Specification of Letters Patent.　　Patented Apr. 17, 1917.

Application filed September 29, 1914. Serial No. 864,038.

*To all whom it may concern:*

Be it known that I, HARRY E. DEY, a citizen of the United States, residing in Jersey City, in the county of Hudson and State of New Jersey, have invented certain new and useful Improvements in Controllers for and Methods of Regulating Electric Motors, of which the following is a specification.

My invention relates to controllers for electric motors and it has special reference to mechanisms of this character which are adapted for use on electrically-propelled vehicles.

The objects of my invention, among other things, are to provide a controller having a single operating member by which the electric motor may be controlled in its speeds in either direction of motor rotation, and also be operated as a generator for braking; also to provide all the advantages of both shunt and series type motors, as my device permits interchanging from one to the other at will. The advantage of the series motor for traction purposes is its capacity of giving increased torque with decreased speed; the shunt type, however, runs at a practically uniform speed, regardless of the load, and consumes current approximately in direct ratio to the torque required. With a series motor the speed on an ascending grade drops off to an inconveniently slow rate, while on descending grades the power has to be completely shut off and the brakes applied. With the shunt motor, however, with a given position of the controller handle the speed remains practically uniform irrespective of the steepness of the grade or its direction. On an ascending grade the shunt motor will draw heavier than the series motor, but, as its speed is greater and will cover a greater distance in a given time, the watts per mile should not be materially different, unless the grade is so steep as to cause the motor to lose in efficiency from overload or the battery voltage to drop from the same cause. When a down grade is reached the counter electro-motive force exceeds the battery voltage causing the current to reverse in direction, and so recharge the battery. The fluctuating counter electro-motive force absolutely controls the current output and intake without any manipulation of the controller lever. If the load becomes too great, however, for the shunt type motor, a slight movement of the controller handle will at once convert it into a series motor.

Another advantage of the shunt type motor is, that whenever the armature circuit is opened, the sparking or arcing at the switch is very slight because the potential only equals the difference between the applied and the counter electro-motive force, which is seldom more than a few volts, while the series motor has to take care of the full line voltage multiplied by the field induction. This objectionable feature in the series motor has caused a general abandonment of the series-multiple control, due to the burning of the controller contacts every time the operator changed from one battery combination to another. With my improved controller, I temporarily convert the machine to the shunt type with every battery change and also at the final throw off of the power, such converting being performed automatically through special contacts and coacting finger operated in conjunction with the main switch.

Since the characteristics of a shunt and separately excited motor are substantially alike in principle, I employ the word "shunt" throughout this specification in preference to the expression "separately excited." The motor used with my system of control is of the plain series field type, but I do not wish to confine myself to a plain series winding, for there are occasions where compound or differential windings may be found desirable.

In the accompanying drawings, Figure 1 is a central longitudinal section of my controller attached to its support.

Fig. 2 is a cross-sectional view taken on the line A—B of Fig. 1.

Fig. 3 is a top plan view.

Figs. 4 and 5 are detail views of the reversing switch shown in section in Fig. 1.

Fig. 6 is a developed view of the contact segments inside the controller and also includes diagrammatic views of the motor and battery.

Figs. 7 to 14 inclusive are diagrams of a few of the typical combinations obtained for various speed changes with series and shunt control.

Fig. 15 is detail view in vertical section of a spring latch device determining the position of the control.

Similar numerals and letters refer to similar parts throughout the several figures.

In the following description it is assumed, for example only, that the battery is divided into four groups. The battery can, however, be, of course, subdivided into any number of groups, according to requirements.

The principle of my improved system of control is based upon a series type motor in conjunction with an auxiliary battery that can be connected across the field at will. When the battery circuit is open, the motor is operating as a typical series motor, but when the battery is shunted across the field, the field current will remain practically constant, for if the armature current drops below normal, due to light load, the battery will make up the deficiency, while if the armature current is above normal the current will divide at the field, the normal amount passing through the field while the excess shunts off through the battery, recharging it to that extent. Consequently the battery is alternating from charging to discharging according to conditions of roads and grades. It is advisable that this auxiliary battery should receive, on the average, slightly more than the amount of discharge, and so need never be placed in circuit when the main battery is charged. As a rule, this auxiliary battery need not exceed one or two cells, except when a very high voltage is used for the main battery.

Referring to the figures, my controller comprises a casing 1, preferably cylindrical in form, molded from any suitable insulating material, and having the contact plates $a$, $b$, $c$, $d$, etc., firmly attached on the inner cylindrical surface of the casing. The casing 1 is provided with a metal cover 2 and has an extension 3, by which the cover 2 is attached to the steering pillar 4. A hub 5 in the center of this cover 2 supports the plate 6, upon which is mounted the wrist-pin 7 which, through the link 8, is connected to the crank 9 secured to the sleeve 10 mounted on the pillar 4. The crank 9 serves to transmit motion from the hand lever at the steering wheel (not shown).

The bottom of the casing 1 is bored so as to receive the hub 11 of the body member 12 of a rheostat device. This rheostat body member 12 and the plate 6 are bored so as to receive the opposite ends of the shaft 13, which is fixed to both body member 12 and plate 6 by the keys 14 and 15 respectively. Sleeved upon this shaft 13 is a diamond-shaped block 16, made of non-conducting material which supports the contact brushes 17 to 23 inclusive, arranged to bridge the contact segment plates $a$, $b$, $c$, $d$, etc., in the direction of motion, as shown in Fig. 6. This block 16 is connected to the plate 6 through the coil spring 24, as shown in Fig. 1. The rheostat finger 25 is molded in the block 16 similarly to the contact brushes and consequently moves with it, while the rheostat body member 12 moves with the shaft 13.

The top of the block 16 carries a spring latch-pin 26, shown in Figs. 1 and 15, which engages with holes 27 in the cover 2. Each of these holes 27 contains a ball 28 of practically the same diameter as the hole. The number of holes 27 corresponds with the number of "snap" changes, or each main position of control, which in the device illustrated is five. The under side of the plate 6 has a beveled recess 29 located so as to serve as cams to press the ball 28 downwardly, as shown in Fig. 15, and so force the pin 26 out of engagement with the cover 2.

The operation of my controller, thus far, is as follows: A rotary motion of the plate 6 turns the shaft 13, and therefore the rheostat body 12 along with this shaft 13; such rotary motion also winds up the spring 24, and when one-twelfth of a revolution is reached (there being six contact plates on one half of the inner surface of the casing 1), the flat face of the plate 6, through the ball 28, forces the pin 26 out of engagement with the cover 2, thereby releasing the block 16, while the spring 24 immediately snaps it around to the next main control point. Since the rheostat finger 25 is carried with the block 16, it catches up with the previous movement of the body 12, and the resistance conditions are thereby restored to their original form.

While a rheostat plate, in which the resistance wires are embedded in the plate might be used, I prefer to employ external resistance and to have the wires 31 and 32 brought out of the controller as shown in Fig. 1; otherwise the heating might prove troublesome and objectionable. Since these wires 31 and 32 are composed of many strands and are consequently quite flexible, I do not anticipate any trouble from the twisting they receive in the fraction of a turn to which they are subjected.

The rheostat contact segments $x$, $x'$, $y$, $y'$, etc., shown in section in Fig. 1 and diagrammatically in Fig. 6, are the resistance terminals for the armature and the resistance and shunt terminals for the field. The finger 25 serves to progressively connect these terminals in parallel with one another, and eventually short circuit them through the wires 31 and 32. The contact brush 21 is connected with the finger 25 by the wire 33.

The pole-changing, or reversing, switch 34 is pivoted at 35 to the cover 2 and is operated by an extension 36 from the crank 9. Contact blades 37 to 44 inclusive for the reversing switch 34 are located inside the casing 1 as shown in Fig. 2.

In Fig. 1, 2, 4 and 6, the contacting brushes 17 to 23 inclusive are shown at the neutral or off position, and the reversing switch 34 is also shown in its neutral position which it would only assume when passing between "electric brake" and "reverse."

In Fig. 3 the parts are illustrated corresponding with the electric braking position.

It will be noted in Fig. 3 that in whichever way the crank 9 is moved, the plate 6 will have only a movement in one direction, due to the crank 9 being at "dead center"; consequently the contact brushes 17 to 23 inclusive will travel over the same set of contact plates for either a forward or backward movement, thereby giving the same combinations of batteries and resistances. As this point of control is passed toward "reverse," however, the extension 36 on the crank 9 meets one of the projections of the switch 34, which reverses the polarity connections of the auxiliary battery, as shown in Fig. 6, and so reverses the field of the motor with consequent reverse of direction of motion.

I will now describe briefly the combination of circuits formed at different positions of the controller handle.

Referring to Fig. 6, the contact plates $a$ to $r$ inclusive are arranged at one side of the cylindrical casing, while the plates $s$ to $w$ inclusive are arranged on the diametrically opposite side. The contact brushes 17 to 23 inclusive are shown at the neutral position on the lines C—D and E—F respectively. If these brushes are moved to the next position on the left on the lines G—H and I—J respectively, the plates $a$ and $b$ will be bridged by brush 17, thus grounding the negative terminal of the armature, and, as the other terminal is already grounded, a dead short circuit is produced. An intermediate step with resistance can, of course, be inserted here. The brush 20 bridges the contacts $n$ and $o$ which closes the auxiliary battery circuit to the field, energizing the latter and causing a very strong current to be generated in the armature, thereby producing a powerful electric brake.

If, from the neutral position, the brushes are moved to the right to the next position on the lines L—M and N—O respectively, the segment plates $c$, $d$ and $e$, $f$ and $g$ are bridged, and thus connect all of the negative terminals of the battery to the negative brush of the armature. The opposite segment plates $s$, $t$, $u$ and $v$ are joined, thus connecting all of the positive leads to the brush 21, and thence through the wire 33 through the rheostat to the positive field terminal of the motor. Thus the batteries are connected in parallel of four, giving one quarter of the voltage for the first speed forward without resistance as a straight series motor, as shown in Fig. 10.

In the next position to the right when the brushes are on the lines P—Q and R—S respectively the plates $e$ and $h$ are bridged, thus connecting the negatives of the first and third batteries to the negative of the armature; the bridging of $f$ and $i$ connects the positive of the third battery to the negative of the fourth, or series connection; the bridging of $g$ and $j$ connects the positive of the first battery to the negative of the second, also a series connection; and the bridging of $v$ and $w$ joins the positive terminals of the second and fourth batteries through the brush 21, wire 33 and rheostat to the field of the motor. Thus the batteries are connected in series-multiple, as shown in Fig. 13, which corresponds to the second speed without resistance as a straight series motor.

In the next position to the right when the brushes are on the lines T—U and V—W respectively, the plates $h$—$k$, $i$—$l$, and $j$—$m$, form couples to connect all of the batteries in series and to the motor as before described. This is the third and highest speed and is shown in Fig. 14, running as a shunt motor.

It will be observed that during the transition from one battery combination to another, the segments $n$—$o$, $o$—$p$, $p$—$q$, and $q$—$r$, are consecutively bridged; following this in the wiring diagram (Fig. 6), it will be noted that each time a pair of these plates is bridged it closes the circuit of the auxiliary battery to the field, thus preventing the latter from losing its magnetism with consequent arcing at the controller contacts.

In the operation of my improved controller as hereinbefore described, when the block 16 snaps into place, removing the tension from the spring 24, the resistance of the rheostat is reëstablished in circuit, as shown in Fig. 9. As the plate 6 and shaft 13 are rotated, the rheostat body 12 is carried with them, passing under the rheostat finger 25, and thus gradually adds resistance in multiple, as shown in Fig. 6, which decreases the actual resistance until a point is reached where the resistances are short circuited, as shown in Figs. 10 and 13. Passing on farther, the auxiliary battery is shunted across the field with resistance in circuit, as shown in Fig. 11, and a still further movement short circuits this resistance, as shown in Figs. 12 and 14. This final movement gives the motor all of the characteristics of a shunt motor, while the next to the last movement, in which the resistance is in circuit with the field, gives characteristics intermediate between a shunt and series motor. When the operating lever is moved farther than the shunt stage, the block 12 snaps over to the next battery speed, and the previous resistance and shunt features are duplicated, as shown in Fig. 9.

It will be observed that the auxiliary battery connections are such that on the reverse it is in permanent connection with the field, as shown in Fig. 7; otherwise the motor could not be reversed. This applies only to conditions illustrated herein in which the armature and field have a permanent ground connection which is particularly desirable when using a motor in which the armature and field both rotate in opposite directions, for it avoids the use of additional slip rings to take the current to the commutator brushes and the field. When in the reverse position, the main current passes in series through the auxiliary battery to the armature, an additional current from the auxiliary battery passing with it and dividing at the field and armature junction, the auxiliary current passing through the field.

Figs. 4 and 5 show the operation of the reversing switch 34; the crank extension 36 throwing the lever to one side by striking one projection and passing on; coming back it strikes the other projection and throws the switch over to the other side.

Notches should be provided for the controller handle so as to hold it in any of the positions in which there is no resistance in the armature circuit.

I claim as my invention:—

1. The method of regulating the speed of a series electric motor, which consists in varying the supply voltage while temporarily maintaining the motor field excited during the circuit change by a source of electromotive force shunted across the field.

2. The method of regulating the speed of a series electric motor, which consists in varying the supply voltage while temporarily maintaining the motor field excited during the circuit change by a storage battery shunted across the field.

3. The method of regulating the speed of a direct current series electric motor between series characteristic and shunt characteristic, which consists in temporarily connecting and disconnecting successively a source of electromotive force in shunt to the field of the motor.

4. The method of regulating the speed of a direct current series electric motor between series characteristic and shunt characteristic, which consists in temporarily connecting and disconnecting successively a storage battery in shunt to the field of the motor.

5. The combination with a reversible electric motor, of a permanent series connection of field and armature, separate sources of electromotive force connected to the field and to the armature, and means for reversing the connections of one of the sources of electromotive force, shunted across the field, to change the direction of rotation of the motor.

6. The combination with a reversible electric motor, of a permanent series connection of field and armature, a source of electromotive force connected to the field and to the armature, a source of electromotive force shunted across the field, and means for reversing the connections of said second source of electromotive force, shunted across the field, to change the direction of rotation of the motor.

7. The combination with a reversible electric motor, of a permanent series connection of field and armature, a source of electromotive force connected to the field and to the armature, a storage battery shunted across the field, and means for reversing the connections of said storage battery, shunted across the field, to change the direction of rotation of the motor.

8. The combination with a series electric motor, of a motor circuit and a source of current therefor, a separate source of electromotive force, and means temporarily connecting said source of electromotive force in shunt with the motor field before opening the motor circuit.

9. The combination with a series electric motor, of a main circuit and a source of current therefor, a separate source of electromotive force, and means for temporarily connecting said source of electromotive force in shunt with the motor field during the period when the main circuit is opening.

10. The combination with a series electric motor, of a main circuit and a source of current therefor, a separate source of electromotive force, and means for temporarily connecting said source of electromotive force in shunt with the motor field during the main circuit change.

11. The combination with a series electric motor, of a motor circuit and a source of current therefor, a storage battery and means temporarily connecting said storage battery in shunt with the motor field before opening the motor circuit.

12. The combination with a series electric motor, of a motor circuit and a source of current therefor, a storage battery, and means temporarily connecting said storage battery in shunt with the motor field during the motor circuit change.

13. The combination with an adjustable speed series electric motor, of a motor circuit and a source of current therefor, a separate source of electromotive force, and means connecting said source of electromotive force in shunt with the motor field while the motor circuit is opening.

14. The combination with an adjustable speed series electric motor, of a motor circuit and a source of current therefor, a storage battery, and means connecting said storage battery in shunt with the motor field while the motor circuit is opening.

15. The combination with an adjustable speed series electric motor, of a motor circuit and a source of current therefor, a separate source of electromotive force, and means temporarily connecting said source of electromotive force in shunt with the motor field before opening the motor circuit.

16. The combination with an adjustable speed series electric motor, of a motor circuit and a source of current therefor, a storage battery, and means temporarily connecting said storage battery in shunt with the motor field before opening the motor circuit.

17. A controller for electric motors comprising a rotatable shaft, a block sleeved upon said shaft, a spring connection between said shaft and said block, means for locking and unlocking said block step by step for the several battery combinations, and a resistance device having two movable members affixed respectively to said block and said shaft to repeatedly interpolate and cut out the resistance between the various battery changes.

18. A controller for electric motors comprising a rotatable shaft, a block sleeved upon said shaft, a spring one end of which is attached to said shaft and the other end to said block, means for locking and unlocking said block step by step for the several battery combinations, and a resistance device having two movable members affixed respectively to said block and said shaft to repeatedly interpolate and cut out the resistance between the various battery changes.

19. A controller for electric motors comprising a rotatable shaft, a block sleeved upon said shaft, a spring connection between said shaft and said block, means for locking and unlocking said block step by step for the several battery combinations, an auxiliary battery circuit, and a resistance device having two movable members affixed respectively to said block and said shaft to repeatedly interpolate and cut out the resistance and said auxiliary battery circuit between the various battery changes.

20. A controller for electric motors comprising a rotatable shaft, a block sleeved upon said shaft, a spring one end of which is attached to said shaft and the other end to said block, means for locking and unlocking said block step by step for the several battery combinations, an auxiliary battery circuit, and a resistance device having two movable members affixed respectively to said block and said shaft to repeatedly interpolate and cut out the resistance and said auxiliary battery circuit between the various battery changes.

21. A controller for electric motors comprising a casing, a shaft rotatable in said casing, a block sleeved upon said shaft, a spring one end of which is attached to said shaft and the other end to said block, a latch pin to engage holes in the casing to lock said block in position for the several battery combinations, a ball resting in each hole, a cam member passing over said balls to unlatch said pin, an auxiliary battery circuit, and a resistance device having two movable members affixed respectively to said block and said shaft to repeatedly interpolate and cut out the resistance and said auxiliary battery circuit between the various battery changes.

22. A controller for electric motors comprising a plurality of contacts arranged to successively connect with terminals of separate sources of electromotive force to vary the speed of said motor, and means for bridging said contacts in the direction of motion.

23. A controller for electric motors comprising a plurality of contacts arranged to successively connect with terminals of separate sources of electromotive force to vary the speed of said motor, and means comprising a double crank pin and connecting rod mechanism for bridging said contacts in the direction of motion.

24. A controller for electric motors comprising a plurality of contacts arranged to successively connect with terminals of separate sources of electromotive force to vary the speed of said motor, means comprising a double crank pin and connecting rod mechanism for bridging said contacts in the direction of motion, and a reversing pole-changing switch operable when said bridging means passes through its dead center position.

25. A controller for electric motors comprising means for regulating the speed thereof, a reversing switch, a shaft connected with the movable member in the controller, two crank pins one mounted on said shaft and the other on the operating device, a rod connecting said crank pins arranged to be at its approximate dead center at the reversing position of the controller, and means for automatically operating said switch during said dead center transition.

26. A controller for electric motors to vary the speeds comprising batteries connected to the motors with the field and armature in series connection, an auxiliary battery circuit, and means to connect the auxiliary battery circuit with the field and short circuit the armature to act as a brake, as the controller is retracted.

27. A controller for electric motors to vary the speeds comprising batteries connected to the motor with field and armature in series connection and resistance inserted, means to successively cut out the resistance as the controller is advanced, an auxiliary circuit, means for connecting said auxiliary battery in shunt across the field, and means automatically connecting said auxiliary battery circuit and interpolating the resistance, as the controller handle is further advanced.

28. A controller for a series electric motor to vary the direction of rotation, comprising a main source of electromotive force, a separate source of electromotive force, means to connect said sources of electromotive force in series to the junction of the field and armature, means to connect the opposite end of the field to the junction between said sources of electromotive force, and means to connect the opposite end of the armature with said main source of electromotive force.

29. A controller for a series electric motor to vary the direction of rotation, comprising a main battery, an auxiliary battery, means to connect said batteries in series to the junction of the field and armature, means to connect the opposite end of the field to the junction between the main and auxiliary batteries, and means to connect the opposite end of the armature to the main battery.

HARRY EUGENE DEY.

Witnesses:
PHILIP C. PECK,
WILLIAM J. HOPKINS.